United States Patent [19]

Sheill et al.

[11] Patent Number: 4,781,272
[45] Date of Patent: Nov. 1, 1988

[54] FRICTION PAD AND SUPPORT FOR A DISC BRAKE

[75] Inventors: David D. Sheill, Farmington Hills; Donald J. Davidson, Troy; David J. Dettloff, Utica, all of Mich.

[73] Assignee: Rockwell International Corporation, Pittsburgh, Pa.

[21] Appl. No.: 752,709

[22] Filed: Jul. 8, 1985

Related U.S. Application Data

[63] Continuation of Ser. No. 528,330, Aug. 31, 1983, abandoned.

[51] Int. Cl.[4] .............................................. F16D 65/02
[52] U.S. Cl. .................. 188/73.1; 188/250 B
[58] Field of Search ............... 188/73.1, 250 B, 73.32, 188/73.39, 73.33, 73.34

[56] References Cited

U.S. PATENT DOCUMENTS

| 3,235,952 | 2/1966 | Arrasmith | 188/242 X |
|---|---|---|---|
| 3,366,200 | 1/1968 | Hayes | 188/250 B X |
| 3,602,328 | 8/1971 | Fannin et al. | 188/73.32 X |
| 3,800,923 | 4/1974 | Rike | 188/73.34 |
| 3,972,393 | 8/1976 | Courbet et al. | 188/73.1 X |
| 4,220,223 | 9/1980 | Rinker et al. | 188/73.1 |
| 4,313,527 | 2/1982 | Pickel | 188/73.1 X |
| 4,352,414 | 10/1982 | Scott | 188/73.34 X |
| 4,355,707 | 10/1982 | Saito | 188/73.32 |
| 4,533,025 | 8/1985 | Carre | 188/73.1 X |
| 4,537,292 | 8/1985 | Tamura | 188/73.39 |

FOREIGN PATENT DOCUMENTS

| 2236749 | 2/1974 | Fed. Rep. of Germany | 188/73.1 |
|---|---|---|---|
| 2649843 | 5/1977 | Fed. Rep. of Germany | 188/73.34 |
| 1565668 | 3/1969 | France | 188/250 B |
| 18125 | 2/1981 | Japan | 188/71.1 |
| 2033988 | 5/1980 | United Kingdom | 188/73.34 |

Primary Examiner—George E. A. Halvosa

[57] ABSTRACT

The invention relates to a friction pad for a disc brake and a disc brake assembly in which the friction pads are slidably supported by tabs extending radially outward of the friction pad backing plates on spaced axially extending, stepped edges of an aperture provided to the disc brake caliper. The friction pad tabs include support surfaces or shoulders which are non-symmetrical and permit the tabs to be assembled only when properly oriented.

6 Claims, 4 Drawing Sheets

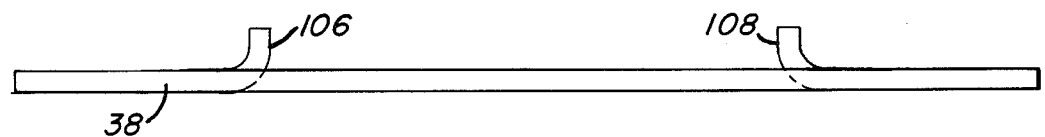
FIG. 5
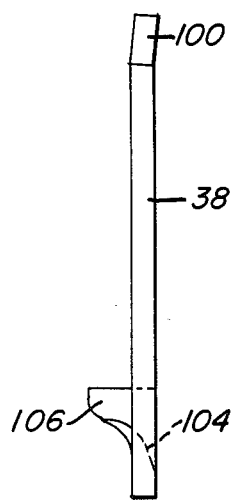
FIG. 6
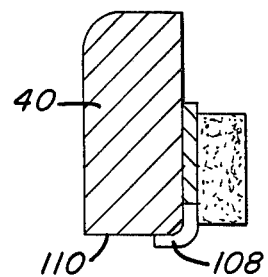
FIG. 3
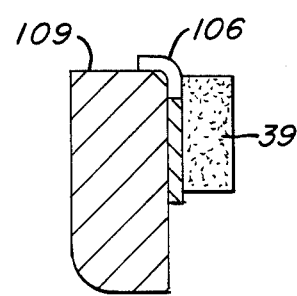

FRICTION PAD AND SUPPORT FOR A DISC BRAKE

This application is a continuation of application Ser. No. 528,330, filed 8-31-83, now abandoned.

BACKGROUND OF THE INVENTION

1. Field of the Invention.

The present invention relates to a disc brake assembly and more specifically to an improved means for supporting friction pads in the disc brake assembly.

The present invention is particularly applicable to a disc brake assembly of the type which includes a rotor or disc mounted for rotation with a vehicle wheel and a floating caliper straddling the periphery of the rotor. The caliper is usually mounted on a support or torque plate by means permitting movement of the caliper in an axial direction relative to the torque plate and rotor. Brake pads are carried by the caliper on opposite sides of the rotor and are movable into contact with oppositely disposed friction braking surfaces of the rotor by actuating means usually driven by a fluid motor. In a floating caliper disc brake, each friction pad is located intermediate one leg of the caliper and the adjacent friction surface of the rotor. The actuating mechanism is usually carried by one leg of the caliper and serves to move the friction pad adjacent to that leg axially into contact with the rotor, the reaction force of the contact serving to draw the other leg of the caliper and the other friction pad into contact with the opposite surface of the rotor.

2. Description of the Prior Art.

Disc brake pads have been provided with projections or extensions in the form of tabs which service to mount or support the disc brake pad for sliding movement relative to a caliper. Tabs have been provided at the circumferentially spaced edges of the brake pads to be slidably carried in grooves provided to the caliper. Supporting surfaces in the form of edges have been provided at the ends of brake pads and on tabs or projections provided to the brake pads to be slidably supported by complimentary edges provided to the disc brake caliper. Examples of such arrangements may be found in U.S. Pat. Nos. 3,942,612; 3,972,393 and 4,068,743. U.S. Pat. No. 4,352,414 discloses a friction pad having a supporting tab with radially converging edges slidably carried by circumferentially spaced, radially converging edges provided to a caliper aperture.

Although various arrangements are known for supporting friction pads within a disc brake assembly, some require additional elements for preventing inadvertent displacement of the friction pads away from their operative position and others require disassemnly of parts or retraction of the actuating mechanism to replace the friction pads which may not be readily accomplished in the confines of the vehicle wheel end and in the area where such work is performed. Others relying on radially converging edges or angularly disposed surfaces to support the friction pad or to transmit torque to the supporting caliper require careful attention to tolerances during manufacture to assure proper fit and location of cooperating parts when the brake is assembled. The present invention avoids these problems by providing a disc brake assembly in which the friction pads do not require additional elements for securing the same in operative position and in which the friction pads are readily accessible for inspection or replacement purposes.

SUMMARY OF THE INVENTION

The present invention provides an improved friction pad support for a vehicle disc brake including a rotor having oppositely disposed friction surface, a caliper having a bridge extending across the periphery of the rotor and a pair of friction pads supported by the caliper opposite the friction surfaces of the rotor. Each friction pad is comprised of a backing plate and friction material secured to a major portion of the backing plate. Each backing plate includes a tab extending radially therefrom and having a head portion bounded by a pair of circumferentially spaced edges and a neck portion joining the head portion to the major portion of the backing plate. The head portion is joined to the neck portion by a supporting surface at each end of the tab to provide a pair of stepped recesses one of which, on at least one tab, is longer than the other.

An aperture is provided in the caliper bridge and is defined on two sides by circumferentially spaced, axially extending, stepped edges with the step in one edge being shorter than the step in the other edge and shorter than the longer supporting surface on the tab. The friction pads are slidably supported by the backing plate tabs on the stepped edges of the aperture to extend radially inward on opposite sides of the rotor and the friction pad having the non-symmetrical mounting tab can only be assembled to the stepped edges of the aperture when the longer supporting surface is positioned on the stepped edge with the longer step.

The advantages offered by the present invention will become apparent from the following description of the embodiment shown in the accompanying drawings.

DESCRIPTION OF THE DRAWINGS

In the drawings, wherein like reference numerals refer to like parts:

FIG. 3 is a sectional view taken along line 3—3 of FIG. 1;

FIG. 5 is a plan view of the friction pad backing plate of FIG. 4;

FIG. 6 is a side elevation of the friction pad of FIG. 4;

DESCRIPTION OF THE INVENTION

Figure 1:
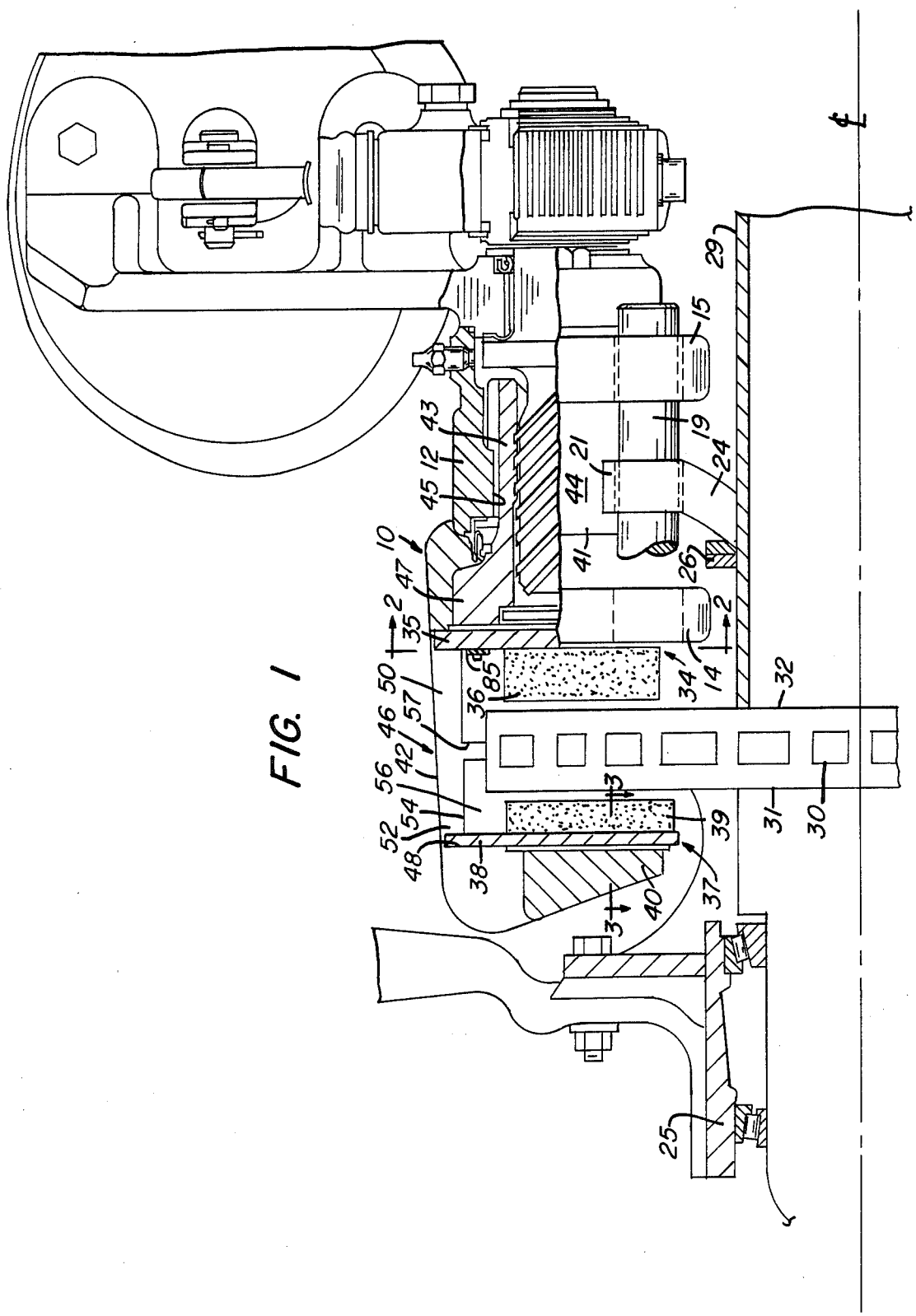
FIG. 1 is a front elevation of disc brake, partly in section incorporating the present invention.

With reference to the drawings, FIG. 1 shows a disc brake assembly generally designated by the numeral 10. The assembly 10 includes a floating caliper 12 mounted by means of circumferentially spaced, axially aligned pairs of bosses 14 and 15, on slide pin 19 only one of which is shown. The slide pins are respectively secured within bores provided to a boss such as the boss 21 at the radially outer extremities of circumferentially spaced, radially extending arms such as the arm 24, of a brake supporting torque plate of spider 26. The torque plate 26 is provided with a circular array of apertures which receive a plurality of bolts not shown which in turn secure the support or torque plate 26 to a flange welded to a vehicle axle 29. The torque plate 26 could of course be welded directly to the axle 29. A rotor 30 having axially spaced, radially extending, oppositely disposed friction braking surfaces 31 and 32 is secured for rotation with a wheel hub 25 carried by the vehicle axle 29 adjacent the disc brake assembly 10.

The caliper 12 is a cast metal component comprised of a depending leg 40 extending radially inward adjacent the friction surface 31 of rotor 30, an oppositely disposed depending leg or wall 41 adjacent the friction surface 32 of rotor 30 and a bridge 42 straddling the periphery of rotor 30 and joining the leg 40 to the wall 41. The wall 41 is formed with a generally cylindrical housing 44 having a bore 45 slidably mounting a piston 43 formed integrally with a load applying plate 47. The contour of the load plate 47 is similar to the contour of the backing plate 35 of the friction pad 34 and moves the pad 34 axially into contact with the rotor friction surface 31 in response to actuation of the brake assembly. The piston 43 and load plate 47 may be moved by suitable hydraulic or mechanical actuating means. A power screw and nut actuating mechanism similar to that disclosed in application Ser. No. 212,000, filed December 1, 1980 is illustrated in FIG. 1.

The bridge 42 of caliper 12 is provided with an aperture 46 defined by a radially disposed edge 48 and a pair of circumferentially spaced, axially expanding, stepped edges 50 and 51. Stepped edge 50 is comprised of two surfaces 52 and 55 joined by a horizontal surface or step 54. Stepped edge 51 is comprised of two surfaces 56 and 59 joined by a horizontal surface or step 58. The circumferentially spaced stepped edges 50, 51 are each provided with a slot only of which slot 57 is shown in edge 50. The slots are located radially outward from the periphery of the rotor 30 and provide access means for friction pads to the caliper.

Figure 2:
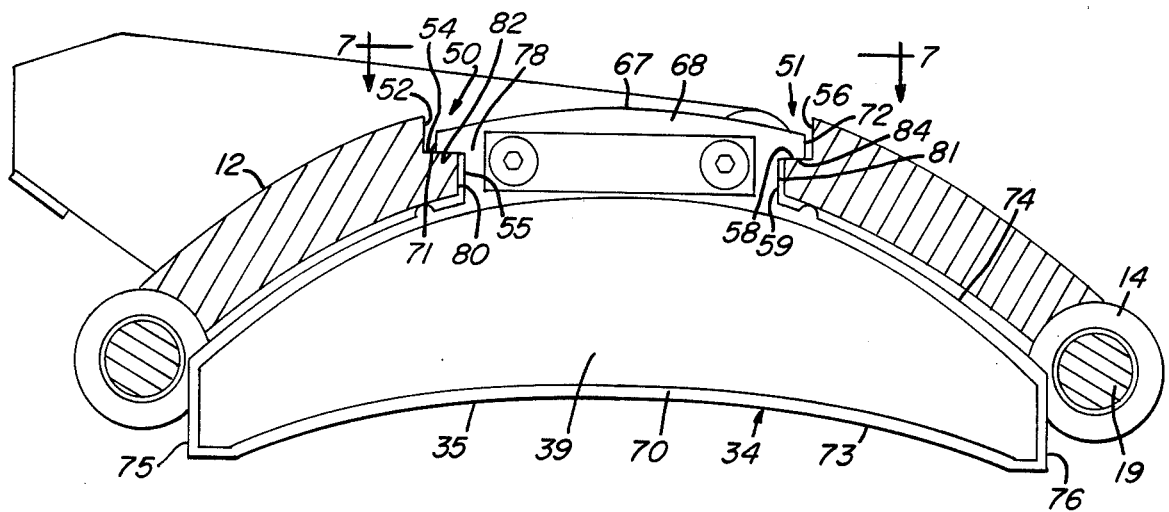
FIG. 2 is a sectional view taken along line 2—2 of FIG. 1.
Figure 4:
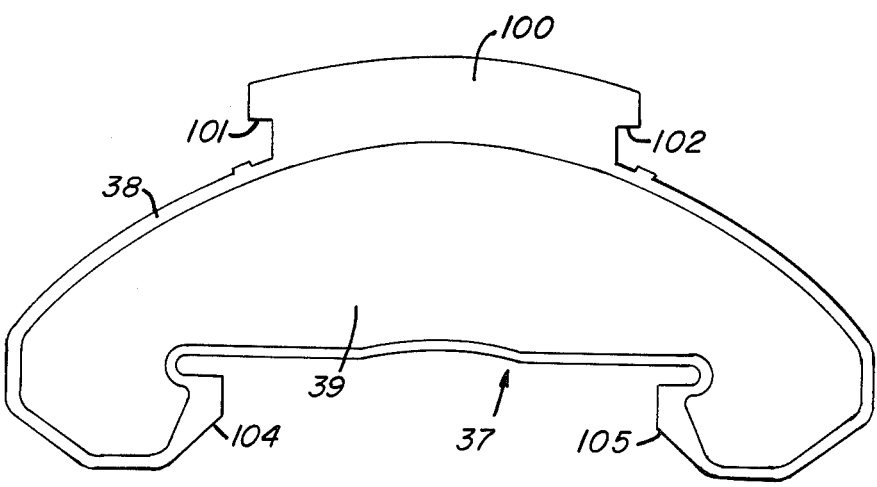
FIG. 4 is a view of a friction pad.

Friction pads 34, 37 are respectively comprised of backing plates 35, 38 with friction material 36, 39 secured thereto. The friction pad 34 as shown by FIG. 2 is comprised of a metal backing plate 35 of uniform thickness having friction material 36 secured to a major portion 70 of the backing plate. The major portion 70 is defined by arcuate longitudinal edges 73 and 74 joined by circumferentially spaced lateral edges 75 and 76. The arcuate edge 74 is of greater radius than the edge 73 and extends radially outward to provide a supporting tab 67 of substantial circumferential length less than the distance between the lateral edges 75, 76.

The supporting tab 67 is comprised of a radially outer head portion 68 laterally bounded by a pair of circumferentially spaced edges 71 and 72 and a neck portion 78 laterally bounded by a pair of circumferentially spaced edges 80 and 81. The distance between the edges 71 and 72 is greater than the distance between the edges 80 and 81. A surface 82 joins the edges 71 and 80. A surface 84 joins the edges 72 and 81. The surfaces 71, 80, 82 and 72, 81, 84 provide stepped recesses at each end of the tab 67 and the surfaces 82 and 84 provide supporting surfaces or shoulders at each end of the tab 67.

The surfaces 52, 54, 55 and 56, 58, 59 provide a stepped edge 50, 51 at each circumferentially spaced side of the caliper aperture 46.

The supporting shoulder 82 and the step 54 in edge 50 are wider or of greater circumferential length relative to the arc of the caliper bridge 12 than the supporting shoulder 84 and the step 58 in edge 51. The width of the shoulder 82 is about 11 centimeters and the width of the step 58 is only about 10 centimeters. The shoulder 82 can not be seated on the step 58 and this non-symmetry on the tab 67, i.e., the difference in the width of the shoulder 82, 84 and the steps 54, 58 prevents the tab 67 and friction pad 34 from being improperly assembled to the stepped edges 50 and 51.

Figure 7:
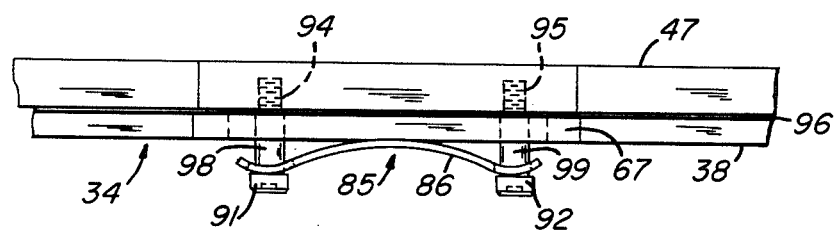
FIG. 7 is a sectional view taken along line 7—7 of FIG. 2.
Figure 8:
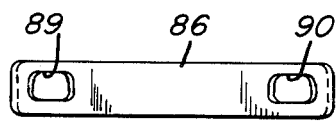
FIG. 8 is a front view of the spring of FIG. 7.

A spring assembly 85, as best shown by FIG. 7 is also provided to bias the friction pad 34 into contact with the force transmitting load plate 47 and thereby prevent vibration of the metal backing plate.

The spring assembly is comprised of leaf spring 86 having a pair of apertures in the form of laterally extending slots 89, 90. A pair of fasteners 91 and 92 are secured in threaded bores 94 and 95 provided to the load plate 47. The fasteners are machine type bolts threaded at one end and having a shoulder and shank extending to a hexagonal socket head at the other end. A fastener 91 or 92 is provided to each aperture 89, 90 and threaded into the bores 94, 95 until the shoulder seats against the surface of the load plate 47. A sheet of vibration damping paper 96 is secured to the rear surface of the metal backing plate 35 and the spring 86 biases the paper backed surface of the friction pad 34 into non-vibrating contact with the load plate 47. The diameter of the fasteners shanks 98 and 99 and the width of the slot-type aperture 89, 90 is such as to permit lateral movement of the friction pad to enable the edges 80 and 81 of the tab 67 to abut the surface 55, 59 of the stepped edge 50, 51 and transfer braking torque to the caliper bridge 12.

Friction pad 37 is also supported by a generally T-shaped tab 100 and stabilized by engagement with the depending caliper leg 40 to prevent vibration of the friction pad backing plate. With reference to FIGS. 3–6, friction pad 37 is comprised of metal backing plate 38 of uniform thickness having friction material 39 secured to a major portion of one surface of the backing plate.

The friction pad tab 100 provides a pair of supporting surfaces or shoulders 101 and 102 which support the radially outer portion of the friction pad 37 on the steps 54 and 58 of the stepped edges 50 and 51.

The radially inner portion of the metal backing plate is die cut at 104 and 105 to provide a pair of arms 106 and 108, bent rearwardly to provide means stabilizing the friction pad 37 against vibration. During assembly, the tab 100 of friction pad 37 is seated on the stepped edges 50, 51 of the caliper apertures and, with reference to FIG. 3, the rearwardly extending legs 106 and 108 are seated with an interference fit against the axially spaced surfaces 109 and 110 of a central recess provided at the lower end of the depending caliper leg 40. The arms 106 and 108 prevent substantial movement and vibration of the radially inner portion of the friction pad 37.

The supporting surfaces 101 and 102 of the tab 100 are symmetrical since the rearwardly extending arms 106 and 108 will engage the rotor 30, if the friction pad is reversed when it is seated on the stepped edges 50, 51 and prevent the brake from being improperly assembled.

When necessary, the friction pads 34 and 37 may be readily installed or withdrawn by removing the slide pin 19, pivoting the caliper 12 about the other slide pin. This movement of the caliper 12 withdraws the friction pads 34, 37 from their operative position adjacent the friction surfaces 31 and 32 of the rotor and enables the backing plate tabs 64, 67 to be slid axially along the stepped aperture edge surfaces 50, 51 into alignment with the access slots 57 thereby permitting radial withdrawal of the friction pads 34, 37 from their supporting relationship with the floating caliper 12. Replacement friction pads may be installed in the reverse manner. The tabs of the replacement friction pads are aligned with the access slot 57 and inserted into the caliper aperture 46 where the tabs are axially displaced into supporting relationship on the stepped aperture edges 50, 51 and spaced apart to permit the friction lining material to move across the oppositely disposed friction surfaces of the rotor. The biasing spring 86 is then secured by the fasteners 91 and 92 to the load plate 47 and the rearward extending arms 106, 108 of friction pad 37 are seated on the caliper leg recess surfaces 109 and 110. The caliper 12 is then pivoted back to align the bore of the caliper bosses 14 and 15 with the bore provided to the boss 21 of torque plate arms 24. The slide pin 19 is then replaced in the axially aligned bore of bosses 14, 15 and 21 and locked in position by suitable means.

The present invention thus provides a simple economical means for mounting disc brake friction pads to a caliper and means for biasing the friction pad into contact with other components to prevent vibration of the friction pad.

The invention may also be embodied in other specific forms without departing from the spirit of essential characteristics thereof. The foregoing description is therefore to be considered as illustrative and not restrictive, the scope of the invention being defined by the appended claims and changes which come within the meaning and range of equivalency of the claims are therefore intended to be embraced thereby.

We claim:

1. A friction pad for a disc brake comprising a backing plate having a major portion defined by arcuate longitudinal edges joined by spaced lateral edges, friction material secured to one side of said major portion of said backing plate and a supporting portion of said backing plate comprising a single T-shaped tab having a head portion joined to said major portion of said backing plate by a neck portion of less circumferential length then said head portion, a surface joining said head portion to said neck portion and forming a shoulder at each end of said tab, said shoulders at each end of said tab being non-symmetrical relative to the major portion of said backing plate whereby each of said shoulders may be slidably received on only one of a pair of corresponding non-symmetrical edges of a supporting member.

2. The friction pad defined by claim 1 wherein a shoulder at one end of said tab is of greater circumferential length than the shoulder at the other end of said tab.

3. In a disc brake assembly including a rotor having oppositely disposed friction surfaces, a caliper having a bridge extending across the periphery of said rotor and a pair of friction pads supported by said caliper opposite said friction surfaces of said rotor, each said friction pad comprising a backing plate having friction materials secured to a major portion thereof and being defined by circumferentially spaced lateral edges and having a single T-shaped tab extending radially therefrom the improvement comprising: each said tab having a head portion bounded by a pair of circumferentially spaced edges, a neck portion joining said head portion to said major portion of said backing plate, said neck portion bounded by a pair of circumferentially spaced edges, the distance between said circumferentially spaced edges of said head portion being greater than the distance between said circumferentially spaced edges of said neck portion and a pair of supporting surfaces, said supporting surfaces respectively joining one edge of said head portion to one edge of said neck portion to provide a stepped recess at each end of said tab, one of said recesses on at least one of said friction pad tabs being defined by a supporting surface of greater length in a generally circumferential direction than the supporting surface of the other said recess of said tab, and an aperture in said bridge defined on two sides by circumferentially spaced, axially extending stepped edges, the step of one of said stepped edges being of less length in a generally circumferential direction than the step in the other said edge and said one tab supporting surface of greater length, said stepped edges slidably receiving said stepped recesses of said one friction pad tab with said stepped supporting surface of greater length slidably engaging the stepped edge of greater length.

4. The disc brake assembly defined by claim 3 wherein said supporting surfaces provided to said one tab are substantially normal to said circumferentially spaced edges of said neck portion and each of said stepped edges includes a surface substantially normal to the supporting surface at that end of said tab and adjacent a circumferentially spaced edge of said neck portion.

5. The disc brake assembly defined by claim 4 wherein each of said stepped edges include a surface substantially normal to one of said circumferentially spaced edges of said neck portion of said tab and said supporting surfaces are axially and laterally slidably relative to said surface.

6. The disc brake assembly defined by claim 5 wherein lateral movement of said supporting surfaces is limited by abutment of the circumferentially spaced edges of said neck portion of said tab with the respectively adjacent surface of said stepped edges which is substantially normal to the supporting surface of the stepped recesses of said tab.

* * * * *